(12) United States Patent
Fernando et al.

(10) Patent No.: US 11,548,168 B2
(45) Date of Patent: Jan. 10, 2023

(54) CONTROL DEVICE, ROBOT CONTROL METHOD, AND ROBOT CONTROL SYSTEM

(71) Applicant: Telexistence Inc., Tokyo (JP)

(72) Inventors: Charith Lasantha Fernando, Tokyo (JP); Susumu Tachi, Tokyo (JP); Genki Sano, Tokyo (JP); Kouta Minamizawa, Tokyo (JP)

(73) Assignee: TELEXISTENCE INC., Tokyo (JP)

( * ) Notice: Subject to any disclaimer, the term of this patent is extended or adjusted under 35 U.S.C. 154(b) by 447 days.

(21) Appl. No.: 16/684,625

(22) Filed: Nov. 15, 2019

(65) Prior Publication Data

US 2020/0078955 A1 Mar. 12, 2020

Related U.S. Application Data

(63) Continuation of application No. PCT/JP2018/018884, filed on May 16, 2018.

(30) Foreign Application Priority Data

May 17, 2017 (JP) .............................. JP2017-098533

(51) Int. Cl.
*B25J 13/00* (2006.01)
*B25J 13/08* (2006.01)
(Continued)

(52) U.S. Cl.
CPC ............... *B25J 13/088* (2013.01); *B25J 3/00* (2013.01); *G06N 3/008* (2013.01)

(58) Field of Classification Search
USPC ................................................. 700/245–264
See application file for complete search history.

(56) References Cited

U.S. PATENT DOCUMENTS 4,975,856 A * 12/1990 Vold ....................... B25J 9/1602
700/251
5,784,542 A * 7/1998 Ohm ....................... A61B 34/35
901/34

(Continued)

FOREIGN PATENT DOCUMENTS

CN 102229147 A 11/2011
CN 104589347 A 5/2015
(Continued)

OTHER PUBLICATIONS

Design of TELESAR V for Transferring Bodily Consciouness in Telexistence, Charith Lasantha Fernando et al., 2012 IEEE/RSJ International Conference on Intelligent Robots and Systems, pp. 5112-5118, Oct. 7-12, 2012, Vilamoura, Algarve, Portugal, 7 pages.

(Continued)

*Primary Examiner* — Jonathan L Sample
(74) *Attorney, Agent, or Firm* — Rankin, Hill & Clark LLP

(57) ABSTRACT

This control device has: a user information acquisition unit which acquires first user posture information that indicates the posture of a first user operating a robot; a pre-change robot information acquisition unit which, on the basis of the first user posture information, acquires pre-change posture information, which indicates the posture of the robot before the posture of the robot is changed; and a determination unit which determines, as the posture of the robot, a target posture, which is different from the posture of the first user, on the basis of the pre-change posture information and the first user posture information that is acquired by the user information acquisition unit at the time when the robot took the pre-change posture indicated by the pre-change posture information.

13 Claims, 6 Drawing Sheets

(51) Int. Cl.
   *B25J 3/00*      (2006.01)
   *G06N 3/00*      (2006.01)

(56)             References Cited

U.S. PATENT DOCUMENTS

| | | | | |
|---|---|---|---|---|
| 5,841,258 | A * | 11/1998 | Takenaka | B62D 57/02 318/675 |
| 6,115,639 | A * | 9/2000 | Takenaka | B62D 57/02 700/258 |
| 6,728,599 | B2 * | 4/2004 | Wang | A61B 34/70 600/595 |
| 7,865,266 | B2 * | 1/2011 | Moll | G16H 20/40 901/6 |
| 8,160,747 | B1 * | 4/2012 | Blackwell | G05D 1/0038 700/250 |
| 8,442,661 | B1 * | 5/2013 | Blackwell | B25J 5/007 700/62 |
| 8,527,094 | B2 * | 9/2013 | Kumar | A61B 34/70 600/101 |
| 8,600,551 | B2 * | 12/2013 | Itkowitz | A61B 34/77 700/250 |
| 9,643,314 | B2 * | 5/2017 | Guerin | B25J 9/1671 |
| 9,987,749 | B2 * | 6/2018 | Nagendran | B25J 9/1605 |
| 10,489,957 | B2 * | 11/2019 | Zelenin | A63F 13/45 |
| 2006/0217841 | A1 * | 9/2006 | Matsumoto | G05B 19/41815 700/248 |
| 2007/0167702 | A1 * | 7/2007 | Hasser | A61B 90/36 600/407 |
| 2009/0099576 | A1 * | 4/2009 | Wang | A61B 34/35 606/130 |
| 2010/0087955 | A1 * | 4/2010 | Tsusaka | B25J 9/0003 700/245 |
| 2010/0268383 | A1 * | 10/2010 | Wang | B25J 5/00 700/259 |
| 2011/0054689 | A1 * | 3/2011 | Nielsen | G05D 1/0088 700/258 |
| 2011/0190930 | A1 * | 8/2011 | Hanrahan | G06Q 10/06 700/259 |
| 2012/0191245 | A1 * | 7/2012 | Fudaba | B25J 3/04 700/254 |
| 2013/0173055 | A1 * | 7/2013 | Kim | B25J 3/04 700/245 |
| 2013/0310977 | A1 * | 11/2013 | Tsusaka | B25J 9/1656 700/257 |
| 2014/0046128 | A1 * | 2/2014 | Lee | A61B 34/30 600/102 |
| 2015/0025683 | A1 * | 1/2015 | Amano | B25J 9/1692 700/254 |
| 2015/0120047 | A1 * | 4/2015 | Motoyoshi | B25J 9/1697 901/30 |
| 2015/0134114 | A1 * | 5/2015 | Tsusaka | B25J 13/02 700/257 |
| 2015/0148952 | A1 * | 5/2015 | Shiratsuchi | B25J 9/1682 901/3 |
| 2015/0202768 | A1 * | 7/2015 | Moridaira | B62D 57/032 901/1 |
| 2015/0230869 | A1 * | 8/2015 | Shim | A61B 34/30 606/130 |
| 2015/0266509 | A1 * | 9/2015 | Ignaczak | B60W 50/14 701/1 |
| 2016/0001445 | A1 * | 1/2016 | Setsuda | G05B 19/425 700/260 |
| 2016/0046023 | A1 * | 2/2016 | Nagendran | B25J 9/1605 700/258 |
| 2016/0059412 | A1 * | 3/2016 | Oleynik | B25J 9/0018 700/250 |
| 2016/0089782 | A1 * | 3/2016 | Sisbot | B25J 9/163 700/250 |
| 2016/0113720 | A1 * | 4/2016 | Lavallee | A61B 17/15 901/9 |
| 2016/0264139 | A1 * | 9/2016 | Gauthier | B60W 10/06 |
| 2017/0348854 | A1 * | 12/2017 | Oleynik | B25J 9/16 |
| 2018/0330200 | A1 * | 11/2018 | Shibata | G06N 3/04 |
| 2020/0160703 | A1 * | 5/2020 | Augst | G08G 1/09626 |

FOREIGN PATENT DOCUMENTS

| | | |
|---|---|---|
| CN | 105269578 A | 1/2016 |
| JP | 62-029196 | 6/1987 |
| JP | 2006-146435 | 6/2006 |

OTHER PUBLICATIONS

International Search Report of PCT/JP2018/018884, dated Jul. 31, 2018, 1 page.
Written Opinion of PCT/JP2018/018884, dated Jul. 31, 2018, 3 pages.
European Search Report dated Feb. 8, 2021, 9 pages.
Weber, et al., "Position and Force Augmentation in a Telepresence System and Their Effects on Perceived Realism" Eurohaptics Conference, 2009 and Symposium on Haptic Interfaces for Virtual Environment and Teleoperator Systems, World Haptics, 2009, 6 pages.
Artigas, et al., "Time Domain Passivity for Delayed Haptic Telepresence with Energy Reference", Intelligent Robots and Systems, 2007, 6 pages.
International Preliminary Report on Patentability dated Nov. 28, 2019, 5 pages.
Chinese Office Action dated Aug. 29, 2022 issued in corresponding Chinese application No. 201880032666.1 (9 pages).

* cited by examiner

CONTROL DEVICE, ROBOT CONTROL METHOD, AND ROBOT CONTROL SYSTEM

CROSS-REFERENCE TO RELATED APPLICATIONS

The present application is a continuation application of International Application No. PCT/JP2018/018884, filed on May 16, 2018, which claims priority to Japanese Patent Application No. 2017-098533, filed on May 17, 2017. The contents of these applications are incorporated herein by reference in their entirety.

BACKGROUND OF THE INVENTION

The present invention relates to a control apparatus, a robot control method, and a robot control system for controlling a robot.

Techniques for detecting a posture of a user and changing a posture of a robot to a posture corresponding to the detected posture have been researched and developed.

In this regard, a robot system, in which (i) the posture of the user is detected by a user apparatus worn by the user and the posture of the robot is changed to the posture corresponding to the detected posture, (ii) a process corresponding to detection information detected by various sensors provided in the robot is performed by the user apparatus, and (iii) information corresponding to the detection information is provided to the user, is known. The relevant technology is disclosed in, for example, Japanese Examined Patent Application Publication No. S62-29196 and Charith Lasantha Fernando, Masahiro Furukawa, Tadatoshi Kurogi, Sho Katnuro, Katsunari. Sato, Kouta Minamizawa and Susumu Tachi, "Design of TELESAR V for Transferring Bodily Consciousness in Telexistence", 2012 IEEE/RSJ International Conference on Intelligent Robots and Systems(Portugal), Oct. 7-12, 2012.

In such a robot system, the user can operate the robot by changing their own posture (i.e., by moving) while wearing the user apparatus. However, when the robot is caused to execute a certain task, in the conventional robot system, it is sometimes difficult for a user who is not familiar with operating the robot to cause the robot to execute the task with a high accuracy that a user who is familiar with operating the robot can achieve.

BRIEF SUMMARY OF THE INVENTION

Accordingly, an object of the present invention is to provide a control apparatus, a robot control method, and a robot control system that can assist a user in operating a robot.

A control apparatus according to the first aspect of the present invention comprises a first information acquisition part that acquires first user posture information indicating a posture of a first user operating a robot, a second information acquisition part that acquires pre-change posture information indicating a pre-change posture, which is a posture of the robot before changing the posture of the robot on the basis of the first user posture information, and a determination part that determines, as the posture of the robot, a target posture different from the posture of the first user on the basis of the pre-change posture information and the first user posture information acquired by the first information acquisition part at the time when the robot is in the pre-change posture indicated by the pre-change posture information.

A robot control method according to the second aspect of the present invention comprises the computer-implemented steps of acquiring first user posture information indicating a posture of a first user operating a robot, acquiring pre-change posture information indicating a pre-change posture, which is a posture of the robot before changing the posture of the robot on the basis of the first user posture information, and determining, as the posture of the robot, a target posture different from the posture of the first user on the basis of the pre-change posture information and the first user posture information acquired at the time when the robot is in the pre-change posture indicated by the pre-change posture information.

A robot control system according to the third aspect of the present invention comprises a robot, a user apparatus that detects information about a first user operating the robot, a robot control apparatus that controls the robot, and a control apparatus capable of communicating with the user apparatus and the robot control apparatus, wherein the user apparatus transmits first user posture information indicating the posture of the first user to the control apparatus, the robot control apparatus controls a posture of the robot so that the robot reaches the target posture determined by the control apparatus, and the control apparatus includes a first information acquisition part that acquires the first user posture information, a second information acquisition part that acquires pre-change posture information indicating a pre-change posture, which is the posture of the robot before changing the posture of the robot on the basis of the first user posture information, a determination part that determines, as the posture of the robot, the target posture different from the posture of the first user on the basis of the pre-change posture information and the first user posture information acquired by the first information acquisition part at the time when the robot is in the pre-change posture indicated by the pre-change posture information, and a transmission part that transmits the target posture to the robot control apparatus.

DETAILED DESCRIPTION OF THE INVENTION

Figure 1:
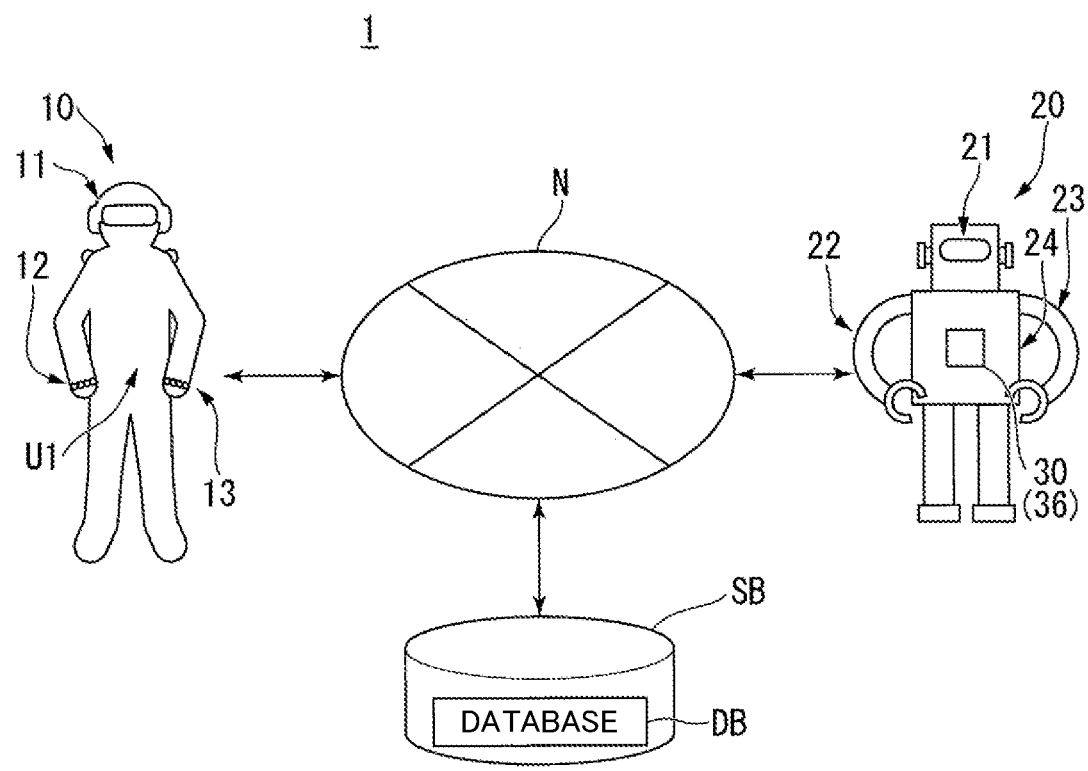
FIG. 1 is a diagram illustrating an exemplary configuration of a robot system according to an embodiment.

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

Outline of Robot System

First, an outline of a robot system 1 will be described. The robot system 1 detects a posture of a user by a user apparatus worn by the user, and changes a posture of a robot to a posture corresponding to the detected posture. Further, the robot system 1 causes the user apparatus to perform a process according to detection information detected by various sensors provided in the robots, and provides information according to the detection information to the user.

Specifically, the robot system 1 includes a user apparatus (a user apparatus 10 in an example described below) for detecting information about a user, a robot (a robot 20 in the example described below), and a robot control apparatus (a robot control apparatus 30 in the example described below) for controlling the robot. The robot system 1 acquires first information from the user apparatus 10, the first information including user posture information indicating the user's posture, which is the posture of the user. The robot system 1 changes, on the basis of the acquired first information, a pre-change posture, which is the posture of the robot before changing the posture, to a target posture, which is the posture corresponding to the user's posture indicated by the user posture information included in the acquired first information, and causes the user apparatus 10 to perform a process corresponding to the detection information detected by the robot. The robot system 1 causes the user apparatus 10 to perform the process to provide information corresponding to the detection information to the user.

In the robot system 1, the user can operate the robot by changing their own posture (that is, by moving the user) while wearing the user apparatus 10. The robot system 1 is characterized in that even a user who is not familiar with operating the robot can perform an operation equivalent to a user who is familiar with operating the robot.

Hereinafter, for convenience of description, the user who is not familiar with operating the robot provided in the robot system 1 will be referred to as a first user, and the user who is familiar with the operation will be referred to as a second user. That is, the first user is, for example, a layman in the operation, and the second user is, for example, an expert in the operation. In the following description, for the sake of convenience, a robot operated by the first user is referred to as a first robot and a robot operated by the second user is referred to as a second robot. It should be noted that the first robot and the second robot may be the same robot or different robots.

In order to solve the problem of the conventional robot system, the robot system 1 includes a control apparatus 36, which will be described later. The control apparatus 36 acquires the first information including first user posture information indicating the first user's posture, which is the posture of the first user. In addition, the control apparatus 36 acquires second information including at least pre-change posture information among (i) the pre-change posture information indicating a pre-change posture, which is the posture of the first robot before changing the posture on the basis of the acquired first information and (ii) the above-described detection information.

The control apparatus 36 determines a target posture corresponding to the first user's posture indicated by the first user posture information included in the first information, which is the posture of the first robot, on the basis of (i) the reference information including information in which, for each piece of the second user posture information indicating the second user's posture, which is the posture of the second user U2, the second user posture information is associated with the reference posture information indicating the posture serving as the reference, (ii) the acquired first information, and (iii) the acquired second information. The control apparatus 36 can thereby assist the user in operating the robot. The robot control apparatus changes the posture of the first robot to the target posture determined by the control apparatus 36. Hereinafter, the configuration of the robot system 1 including the control apparatus 36 and the process performed by the control apparatus 36 will be described in detail.

Configuration and Outline of Robot System

Next, a configuration and the outline of the robot system 1 will be described.

FIG. 1 is a diagram illustrating an exemplary configuration of the robot system 1 according to an embodiment. The robot system 1 includes the user apparatus 10, the robot 20, and a server SB housing a database DB. Further, in the robot system 1, the robot 20 includes the robot control apparatus 30. It should be noted that the robot 20 may be configured to be connected to the robot control apparatus 30 installed outside the robot 20 so as to enable communication with each other by wire or radio, instead of the configuration in which the robot control apparatus 30 is incorporated therein.

Hereinafter, an example in which the robot control apparatus 30 includes the above-mentioned control apparatus 36 in the robot system 1 will be described. Further, in the robot system 1, the control apparatus 36 may be provided with any of the user apparatus 10, the robot 20, and the server SB instead of the robot control apparatus 30.

In the robot system 1, the user apparatus 10 and the robot 20 are communicably connected to each other via a network N. It should be noted that the user apparatus 10 and the robot 20 may be communicably connected to each other by wire or radio without using the network N.

The user apparatus 10 and the server SB are communicably connected to each other via the network N. It should be noted that the user apparatus 10 and the server SB may be communicably connected to each other by wire or radio without using the network N.

The robot 20 and the server SB are communicably connected to each other via the network N. It should be noted that the robot 20 and the server SB may be communicably connected to each other by wire or radio without the network N.

The network N may be any communication network. The network N is, for example, the Internet, a mobile communication network, a private line communication network, or the like.

The user apparatus 10 detects information about the user. The information about the user includes the user posture information indicating the user's posture, which is the posture of the user. It should be noted that the information about the user may include other information in addition to the user posture information. The user apparatus 10 according to the embodiment is an apparatus worn by the user.

The user apparatus 10 may be an apparatus that is not worn by the user, as long as it is an apparatus capable of detecting the information about the user. In the example shown in FIG. 1, the user apparatus 10 is worn by a first user U1. Accordingly, the user apparatus 10 detects the information about the first user U1 (that is, information including the first user posture information, which is the user posture information indicating the first user's posture, which is the posture of the first user U1). Hereinafter, a case where the user apparatus 10 is mounted on the first user U1, as shown in FIG. 1, will be described as an example. That is, in the following description, the robot 20 is an example of the above-described first robot.

The user apparatus 10 includes various sensors for detecting the user's posture, and detects the user's posture by performing motion capturing based on values outputted from these sensors. The user apparatus 10 detects the user's posture at a predetermined time interval. The user apparatus 10 generates the user information including the user posture information indicating the detected user's posture, and outputs the generated user information to the robot 20 via the network N. As a result, the user apparatus 10 changes the posture of the robot 20 to the target posture, which is the posture corresponding to the user's posture indicated by the user posture information included in the user information, by the process of the robot control apparatus 30 that has acquired the user information.

Since the user apparatus 10 is worn by the first user U1, the first user's posture, which is the posture of the first user U1, is detected at the predetermined time interval. The user apparatus 10 generates the user information including the first user posture information indicating the detected first user's posture, and outputs the generated user information to the robot 20 via the network N. As a result, the user apparatus 10 changes the posture of the robot 20 to the target posture corresponding to the first user's posture indicated by the first user posture information included in the user information by the process of the robot control apparatus 30 that has acquired the user information.

The predetermined time interval is, for example, 10 milliseconds. The predetermined time interval may be shorter than 10 milliseconds or longer than 10 milliseconds.

More specifically, the user apparatus 10 includes a head-mounted display 11, a data glove 12 which is a data glove for the right hand, a data glove 13 which is a data glove for the left hand, and a user apparatus control part, which is not shown in the figures.

The head-mounted display 11 is mounted on a user's head. The head-mounted display 11 includes a display part, which is not shown in the figures, and causes the display part to display an image. The display part is a display panel that covers a part or all of the field of view of the user when the head-mounted display 11 is mounted on the head of the user. As a result, the head-mounted display 11 allows the user to see the image displayed on the display part. The display panel is a liquid crystal display panel, an organic electroluminescence (EL) display panel, or the like, but may be another display panel. The image is, for example, a moving image, but may be a still image instead.

The head-mounted display 11 includes a speaker for outputting sound. Further, the head-mounted display 11 includes a sensor for detecting a user's head posture, which is the posture of the user's head. The sensor may be any sensor as long as it is capable of detecting the posture of the user's head. The head-mounted display 11 detects the posture of the user's head by means of the sensor in response to a request from the user apparatus control part. The head-mounted display 11 outputs information indicating the detected posture of the user's head to the user apparatus control part. The head-mounted display 11 may be configured to detect the direction of the user's line of sight instead of the posture of the user's head, in these cases, the head-mounted display 11 includes a sensor for detecting the direction of the user's line of sight.

Here, since the head-mounted display 11 is mounted on the head of the first user U1, the image displayed on the display part can be displayed to the first user U1. The head-mounted display 11 detects the first user's head posture, which is the posture of the head of the first user U1, in response to the request from the user apparatus control part. The head-mounted display 11 outputs information indicating the detected first user's head posture to the user apparatus control part.

The data glove 12 is mounted on the user's right hand. The data glove 12 includes various sensors for detecting a user's right hand finger posture, which is the posture of each finger of the right hand, and a user's right arm posture, which is the posture of the right arm of the user. The various sensors may be any sensors capable of detecting the user's right hand finger posture and the user's right arm posture. The data glove 12 detects the user's right hand finger posture and the user's right arm posture in response to the request from the user apparatus control part. The data glove 12 outputs information indicating the detected user's right hand finger posture and information indicating the detected user's right arm posture to the user apparatus control part.

It should be noted that the data glove 12 may be configured to detect the posture of another part of the user in place of either or both of the user's right hand finger posture and the user's right arm posture, or may be configured to detect the posture of the other part of the user in addition to either one or both of the user's right hand finger posture and the user's right arm posture. In these cases, the data glove 12 includes a sensor for detecting the posture of the other part.

The data glove 12 includes a pressure device, which is not shown in the figures, for applying a pressure to each of one or more predetermined parts among the user's parts. The one or more predetermined parts may be, for example, fingertips of the user's right hand. Alternatively, the one or more predetermined parts may be other predetermined parts among the user's parts. In response to the request from the user apparatus control part, the pressure device applies a pressure indicated by the request to a part indicated by the request among the above-mentioned predetermined parts.

Here, since the data glove 12 is worn on the right hand of the first user U1, the data glove 12 detects the first user's right hand finger posture, which is the posture of each finger of the right hand of the first user, and the first user's right arm posture, which is the posture of the right arm of the first user, in response to the request from the user apparatus control part. The data glove 12 outputs information indicating the detected first user's right hand finger posture and information indicating the detected first user's right arm posture to the user apparatus control part.

The data glove 13 is mounted on the user's left hand. The data glove 13 includes various sensors for detecting a user's left hand finger posture, which is the posture of each finger of the left hand, and a user's left arm posture, which is the posture of the left arm of the user. The various sensors may be any sensors capable of detecting the user's left hand finger posture and the user's left arm posture. The data glove 13 detects the user's left hand finger posture and the user's left arm posture in response to the request from the user apparatus control part. The data glove 13 outputs information indicating the detected user's left hand finger posture and information indicating the detected user's left arm posture to the user apparatus control part.

It should be noted that the data glove 13 may be configured to detect the posture of another part of the user in place of either one or both of the user's left hand finger posture and the user's left arm posture, or may be configured to detect the posture of the another part of the user in addition to either one or both of the user's left hand finger posture and the user's left arm posture. In these cases, the data glove 13 includes a sensor for detecting the posture of the other part.

The data glove 13 includes a pressure device, which is not shown in the figures, for applying a pressure to each of one or more predetermined parts among the user's parts. The one or more predetermined parts may be, for example, fingertips of the user's left hand. Alternatively, the one or more predetermined parts may be other predetermined parts among the user's parts. In response to the request from the user apparatus control part, the pressure device applies a pressure indicated by the request to a part indicated by the request among the above-mentioned predetermined parts.

Here, since the data glove 13 is worn on the left hand of the first user U1, the data glove 13 detects the first user's left hand finger posture, which is the posture of each finger of the left hand of the first user, and the first user's left arm posture, which is the posture of the left arm of the first user, in response to the request from the user apparatus control part. The data glove 13 outputs information indicating the detected the first user's left hand finger posture and information indicating the detected first user's left arm posture to the user apparatus control part.

The user apparatus control part controls the entire user apparatus 10. The user apparatus control part may be built in any of the head-mounted display 11, the data glove 12, and the data glove 13, or may be installed outside each of the head-mounted display 11, the data glove 12, and the data glove 13 and connected to each of the head-mounted display 11, the data glove 12, and the data glove 13 so as to enable communication with each other by wire or radio.

The user apparatus control part causes the head-mounted display 11 to detect the user's head posture, causes the data glove 12 to detect the user's right hand finger posture and the user's right arm posture, and causes the data glove 13 to detect the user's left hand finger posture and the user's left arm posture at the predetermined time interval. The user apparatus control part acquires information indicating the user's head posture from the head-mounted display 11, acquires information indicating the user's right hand finger posture and information indicating the user's right arm posture from the data glove 12, and acquires information indicating the user's left hand finger posture and information indicating the user's left arm posture from the data glove 13.

Here, in the embodiment, the user's posture is represented by each piece of the information indicating the user's head posture, the information indicating the user's right hand finger posture, the information indicating the user's right arm posture, the information indicating the user's left hand finger posture, and the information indicating the user's left arm posture. The user posture information may include a part of the information indicating the user's head posture, the information indicating the user's right hand finger posture, the information indicating the user's right arm posture, the information indicating the user's left hand finger posture, and the information indicating the user's left arm posture, or may include other information.

The user apparatus control part generates the user information including the user posture information represented by each piece of the acquired information indicating the user's head posture, the acquired information indicating the user's right hand finger posture, the acquired information indicating the user's right arm posture, the acquired information indicating the user's left hand finger posture, and the acquired information indicating the user's left arm posture. The user information may include other information in addition to the user posture information. The user apparatus control part outputs the generated user information to the robot 20 via the network N.

Since the user apparatus 10 is worn by the first user U1, the first user's head posture is detected by the head-mounted display 11, the first user's right hand finger posture and the first user's right arm posture are detected by the data glove 12, and the first user's left hand finger posture and the first user's left arm posture are detected by the data glove 13 at the predetermined time interval. The user apparatus control part acquires the information indicating the first user's head posture from the head-mounted display 11, acquires the information indicating the first user's right hand finger posture and the information indicating the first user's right arm posture from the data glove 12, and acquires the information indicating the first user's left hand finger posture and the information indicating the first user's left arm posture from the data glove 13.

The user apparatus control part generates the user information including the first user posture information represented by each piece of the acquired information indicating the first user's head posture, the acquired information indicating the first user's right hand finger posture, the acquired information indicating the first user's right arm posture, the acquired information indicating the first user's left hand finger posture, and the acquired information indicating the first user's left arm posture. The user apparatus control part outputs the generated user information to the robot 20 via the network N. The user information is an example of each piece of the first information, third information, and fifth information.

The user apparatus control part acquires the detection information detected by the robot 20 from the robot 20 via the network N. The user apparatus 10 performs a process according to the acquired detection information. In this way, the user apparatus 10 can provide various types of information to at least some of the five senses of the user. In this example, the user apparatus 10 provides the various types of information to each of touch, sight, and hearing among the five senses of the user.

The detection information includes visual information including an image captured by an image capturing part provided to the robot 20, tactile information including an output value from a tactile sensor provided to the robot 20 (the tactile sensation may include a force sensation but does not need to include the force sensation), and auditory information including an output value from a sound detection part provided to the robot 20. The image may be a moving image or a still image. Hereinafter, a case where the image is a moving image will be described as an example.

It is acceptable for the detection information to include only a part of the visual information, the tactile information, and the auditory information, and the detection information may include other information (such as olfactory information or taste information) in addition to some or all of the visual information, the tactile information, and the auditory information. It is acceptable for the detection information to include only the other information in place of some or all of the visual information, the tactile information, and the auditory information. In these cases, the user apparatus 10 provides the various types of information for a sense corresponding to the information included in the detection information among the five senses of the user.

The user apparatus control part causes the display part of the head-mounted display 11 to display an image included in the visual information on the basis of the visual information included in the acquired detection information. The user apparatus control part operates the pressure devices of the data glove 12 and the data glove 13 on the basis of the tactile information included in the detection information, and applies a pressure corresponding to the output value included in the tactile information to the user. The user apparatus control part causes the speaker of the head-mounted display 11 to output sound corresponding to the output value included in the auditory information on the basis of the auditory information included in the detection information.

With such a configuration, the user apparatus 10 can provide information indicating an object viewed by the robot 20 (captured by the image capturing part) to the user's sense of sight as an image included in the visual information, provide information indicating a touch detected by the robot 20 while touching an object (detected by the tactile sensor) to the user's sense of touch as a pressure corresponding to an output value included in the tactile information, and provide sound that the robot 20 heard (detected by the sound detection part) to the user's sense of hearing as sound corresponding to an output value included in the auditory information. As a result, the user can cause the robot 20 to perform the next action desired by the user on the basis of the various types of information provided to at least some of the five senses of the user.

Here, since the user apparatus 10 is worn by the first user U1, it is possible provide the information indicating the object viewed by the robot 20 (captured by the image capturing part) to the sense of sight of the first user U1 as the image included in the visual information, provide the information indicating the touch detected by the robot 20 while touching the object (detected by the tactile sensor) to the sense of touch of the first user U1 as the pressure corresponding to the output value included in the tactile information, and provide the sound that the robot 20 heard (detected by the sound detection part) to the sense of hearing of the first user U1 as the sound corresponding to the output value included in the auditory information. As a result, the first user U1 can cause the robot 20 to perform the next action desired by the first user U1 on the basis of the various types of information provided to at least some of the five senses of the first user U1.

The robot 20 is, for example, a dual-arm robot. The robot 20 includes, as movable parts, a head part 21 corresponding to a head part of the user (in this example, the first user U1) on which the user apparatus 10 is mounted, a right arm part 22 which is a robot arm (manipulator) corresponding to the right arm of the user, and a left arm part 23 which is a robot arm (manipulator) corresponding to the left arm of the user. Further, the robot 20 also includes a support part 24 for supporting each of the head part 21, the right arm part 22, and the left arm part 23. It should be noted that the robot 20 may have a configuration without the head part 21, may be a single-arm robot having only one robot arm (manipulator), may be a multi-arm robot having three or more robot arms, or may have another configuration.

The head part 21 is supported by the support part 24 for rotation about each of one or more predetermined axes. In the following, as an example, a case will be described in which the head part 21 is supported by the support part 24 so as to be rotatable about each of two predetermined axes. The head part 21 includes an actuator for rotating the head part 21 about each of the two axes. Here, the posture of the head part 21 is determined by each of a rotation angle, an angular velocity, an angular acceleration, and a torque of one or more actuators included in the head part 21. The head part 21 operates the actuator in response to a request from the robot control apparatus 30 to change the posture of the head part 21. In response to the request, the head part 21 outputs, to the robot control apparatus 30, information indicating each of the rotation angle, the angular velocity, the angular acceleration, and the torque of the one or more actuators as information indicating the posture of the head part 21.

Further, the head part 21 includes the image capturing part described above. The image capturing part is, for example, a stereo camera equipped with a charge coupled device (CCD), a complementary metal oxide semiconductor (CMOS), or the like, which is an imaging element for converting condensed light into electric signals. Since the image capturing part is provided on the head part 21, a range in which the image capturing part can capture images varies depending on the posture of the head part 21. The image capturing part captures a moving image of the range, but may instead capture a still image of the range. The image capturing part outputs the image obtained by capturing the image of the range as the visual information to the robot control apparatus 30. The image capturing part may be a monocular camera instead of the stereo camera, or may be a compound eye camera with three or more lenses.

The head part 21 includes the sound detection part of the robot 20. The sound detection part is, for example, a sensor for detecting sounds around the head part 21. The head part 21 outputs information including the output value indicating the sounds detected by the sound detection part to the robot control apparatus 30 as the above-mentioned auditory information.

The right arm part 22 is a robot arm having a plurality of joints, and is a robot arm having, as an end effector, a robot hand corresponding to the right hand of the user (in this case, the first user U1) wearing the user apparatus 10. It should be noted that the number of joints of the right arm part 22 may be any number as long as the posture of the right arm part 22 can be changed to a posture corresponding to each of the user's right arm posture and the user's right hand finger posture. Each joint included in the right arm part 22 includes an actuator for rotating the joint.

Here, the posture of the right arm part 22 is determined by each of the rotation angle, the angular velocity, the angular acceleration, and the torque of each of the plurality of actuators included in the right arm part 22. The right arm part 22 operates the actuator in response to the request from the robot control apparatus 30 to change the posture of the right arm part 22. In response to the request, the right arm part 22 outputs, to the robot control apparatus 30, the information indicating each of the rotation angle, the angular velocity, the angular acceleration, and the torque of the one or more actuators as the information indicating the posture of the right arm part 22.

A tactile sensor, which is not shown in the figures, is provided at the tip of each finger of the robot hand of the right arm part 22. The finger part is a part corresponding to each finger of the right hand of the user (in this example, the first user U1) wearing the user apparatus 10 among the parts of the robot hand. The tactile sensor outputs the information including the output value indicating the detected pressure to the robot control apparatus 30 as the tactile information.

The left arm part 23 is a robot arm having a plurality of joints, and is a robot arm having, as an end effector, a robot hand corresponding to the left hand of the user (in this case, the first user U1) wearing the user apparatus 10. It should be noted that the number of joints of the left arm part 23 may be any number as long as the posture of the left arm part 23 can be changed to a posture corresponding to each of the user's left arm posture and the user's left hand finger posture. Each joint included in the left arm part 23 includes an actuator for rotating the joint.

Here, the posture of the left arm part 23 is determined by each of the rotation angle, the angular velocity, the angular acceleration, and the torque of each of the plurality of actuators included in the left arm part 23. The left arm part 23 operates the actuator in response to the request from the robot control apparatus 30 to change the posture of the left arm part 23. In response to the request, the left arm part 23 outputs, to the robot control apparatus 30, the information indicating each of the rotation angle, the angular velocity, the angular acceleration, and the torque of the one or more actuators as information indicating the posture of the left arm part 23.

A tactile sensor, which is not shown in the figures, is provided at the tip of each finger of the robot hand of the left arm part 23. The finger part is a part corresponding to each finger of the left hand of the user (in this example, the first user U1) wearing the user apparatus 10 among the parts of the robot hand. The tactile sensor outputs the information including the output values indicating the detected pressures to the robot control apparatus 30 as the tactile information.

Here, the posture of the robot 20 is represented by the posture of the head part 21, the posture of the right arm part 22, and the posture of the left arm part 23. That is, a change of the posture of the robot 20 means that at least a part of the posture of the head part 21, the posture of the right arm part 22, and the posture of the left arm part 23 has changed.

The robot control apparatus 30 acquires the user information from the user apparatus 10 via the network N. Further, the robot control apparatus 30 acquires pre-change robot information from the robot 20. The pre-change robot information is information including pre-change posture information indicating the pre-change posture, which is the posture of the robot 20 before the robot control apparatus 30 changes the posture on the basis of the acquired user information. The pre-change robot information may include other information in addition to the pre-change posture information. Hereinafter, a case where the detection information detected by the robot 20 is included in the pre-change robot information together with the pre-change posture information will be described as an example. As described above, the detection information is information including each of the visual information, the tactile information, and the auditory information.

The robot control apparatus 30 acquires, from the robot 20, (i) the pre-change posture information including each piece of information indicating the posture of the head part 21 before the robot control apparatus 30 changes the posture on the basis of the acquired user information, information indicating the posture of the right arm part 22 before the change, and information indicating the posture of the left arm part 23 before the change, and (ii) the detection information including each piece of the visual information before the change, the tactile information before the change, and the auditory information before the change. Here, the robot control apparatus 30 acquires three pieces of information from the head part 21, namely the information indicating the posture of the head part 21 before the change, the visual information before the change, and the auditory information before the change. Further, the robot control apparatus 30 acquires two pieces of information from the right arm part 22, namely the information indicating the posture of the right arm part 22 before the change and the tactile information detected by the right arm part 22 which is the tactile information before the change. Furthermore, the robot control apparatus 30 acquires two pieces of information from the left arm part 23, namely the information indicating the posture of the left arm part 23 before the change and tactile information detected by the left arm part 23 which is the tactile information before the change. It should be noted that the pre-change robot information is an example of the second information. The detection information is an example of each of first detection information, third detection information, and fifth detection information.

The robot control apparatus 30 reads the reference information stored in advance in the database DB of the server SB from the server SB via the network N. The reference information includes information in which, for each piece of the second user posture information indicating the second user's posture, which is the posture of the second user U2, the second user posture information is associated with the reference posture information indicating a posture serving as the reference. The posture indicated by the reference posture information associated with a certain piece of second user posture information is a posture corresponding to the second user's posture indicated by the second user posture information among the postures of the second robot which is a robot operated by the second user. The second robot may be the robot 20 or a robot different from the robot 20. Hereinafter, a case where the second robot is the robot 20 will be described as an example.

The reference information is history information in which the second user posture information obtained when the second user U2, who is a user more familiar with the operation of the robot 20 that is the operation of the robot system 1 than the first user U1, previously operated the robot 20 is associated with the reference posture information, which is information indicating the posture of the robot 20 operated by the second user U2, which indicates the posture serving as the reference. It should be noted that the reference information may include other information in addition to information in which, for each piece of the second user posture information, the second user posture information is associated with the reference posture information. Further, the second user may be the same person as the first user U1.

On the basis of the user information corresponding to the first user acquired from the user apparatus 10 mounted on the first user U1, the pre-change robot information acquired from the robot 20, and the reference information read from the database DB of the server SB, the robot control apparatus 30 determines a target posture, which is the posture of the robot 20, corresponding to the user's posture indicated by the user posture information included in the user information. Then, the robot control apparatus 30 operates the robot 20 and changes the posture of the robot 20 to the determined target posture. As a result, the robot control apparatus 30 can assist the first user U1 in operating the robot 20.

In this example, since the user apparatus 10 is worn by the first user U1, the robot control apparatus 30 determines the target posture corresponding to the first user's posture, which is the posture of the robot 20, indicated by the first user posture information included in the user information on the basis of (i) the reference information read from the database DB of the server SB, (ii) the user information acquired from the user apparatus 10, and (iii) the pre-change robot information acquired from the robot 20. Then, the robot control apparatus 30 operates the robot 20 and changes the posture of the robot 20 to the determined target posture. As a result, the robot control apparatus 30 can assist the first user U1 in operating the robot 20.

The server SB is a storage device realized by an information processing device such as a desktop personal computer (PC), a workstation, or the like. The server SB is communicably connected to the user apparatus 10 and the robot 20 (that is, the robot control apparatus 30) via the network N. As described above, the server SB houses the database DB in advance. In response to the request from the robot control apparatus 30, the database DB of the server SB outputs the reference information to the robot control apparatus 30.

Functional Configuration of Robot Control Apparatus

Figure 2:
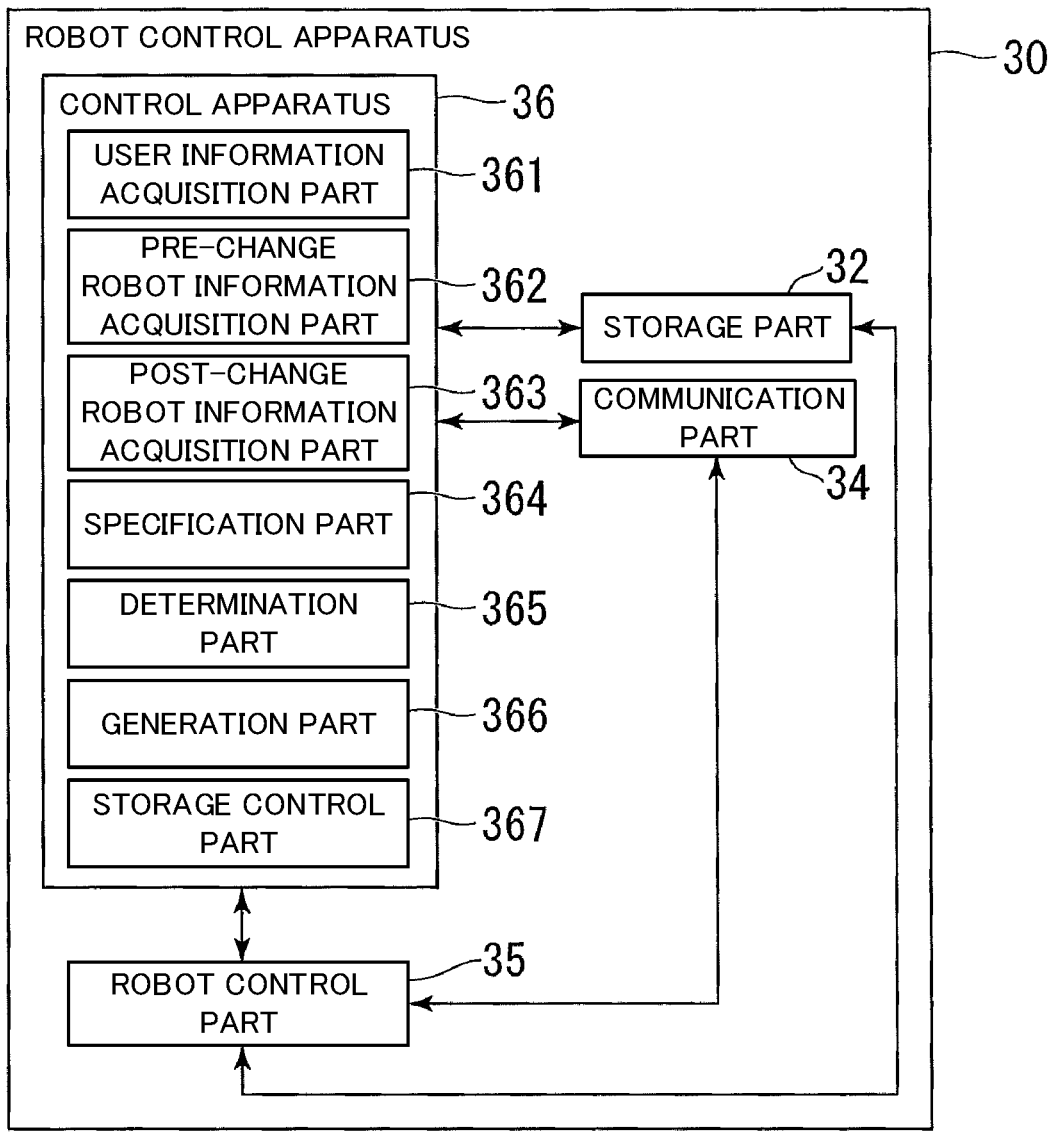
FIG. 2 is a diagram illustrating an exemplary functional configuration of a robot control apparatus.

Hereinafter, the functional configuration of the robot control apparatus 30 will be described while referencing FIG. 2. FIG. 2 is a diagram illustrating an exemplary functional configuration of the robot control apparatus 30.

The robot control apparatus 30 includes (i) a storage part 32 such as a hard disk drive (HDD), a solid state drive (SSD), or the like, (ii) a communication part 34 which is a communication port including a digital input/output port such as a universal serial bus (USB), an Ethernet (registered trademark) port, or the like, (iii) a robot control part 35, and (iv) a control apparatus 36. As described above, the robot control apparatus 30 may be separated from the control apparatus 36.

The robot control part 35 controls the entire robot control apparatus 30. Further, the robot control part 35 operates the robot 20 to change the posture of the robot 20 to the target posture determined by the control apparatus 36. The robot control part 35 is realized by, for example, a central processing unit (CPU), which is not shown in the figures, executing various programs stored in the storage part 32. The robot control part 35 may be a hardware-functional unit such as large scale integration (LSI) or an application specific integrated circuit (ASIC), or the like.

The control apparatus 36 includes a user information acquisition part 361, a pre-change robot information acquisition part 362, a post-change robot information acquisition part 363, a specification part 364, a determination part 365, a generation part 366, and a storage control part 367. These functional parts included in the control apparatus 36 are realized by, for example, a CPU, which is not shown in the figures, executing various programs stored in the storage part 32. Some or all of the functional parts may be hardware-functional units such as LSI and an ASIC.

The user information acquisition part 361 acquires the user information from the user apparatus 10 via the network N. The user information acquisition part 361 is an example of a first information acquisition part and a third information acquisition part.

The pre-change robot information acquisition part 362 acquires the pre-change robot information from the robot 20. The pre-change robot information acquisition part 362 is an example of a second information acquisition part.

The post-change robot information acquisition part 363 acquires the post-change robot information from the robot 20. The post-change robot information is information including post-change information which is the posture of the robot 20 after the posture of the robot 20 is changed to a posture corresponding to the user's posture indicated by the user posture information included in the user information acquired by the user information acquisition part 361. The post-change robot information is information used by the generation part 366, which will be described later, to generate the above-described reference information. The post-change robot information acquisition part 363 is an example of a fourth information acquisition part. The post-change robot information is an example of fourth information and sixth information.

The specification part 364 reads the reference information from the database DB of the server SB via the network N. The specification part 364 specifies, as the subject reference posture information, the reference posture information corresponding to the user posture information included in the user information acquired by the user information acquisition part 361 and the pre-change posture information included in the pre-change robot information acquired by the pre-change robot information acquisition part 362 from among the read reference information.

The determination part 365 determines a target posture corresponding to the user's posture indicated by the user posture information included in the user information acquired by the user information acquisition part 361 on the basis of the subject reference posture information specified by the specification part 364.

The generation part 366 generates the reference information to be stored in the database DB on the basis of the user information acquired by the user information acquisition part 361 and the post-change robot information acquired by the post-change robot information acquisition part 363.

The storage control part 367 stores the reference information generated by the generation part 366 in the database DB.

Process of Robot Control Apparatus Operating a Robot

Figure 3:
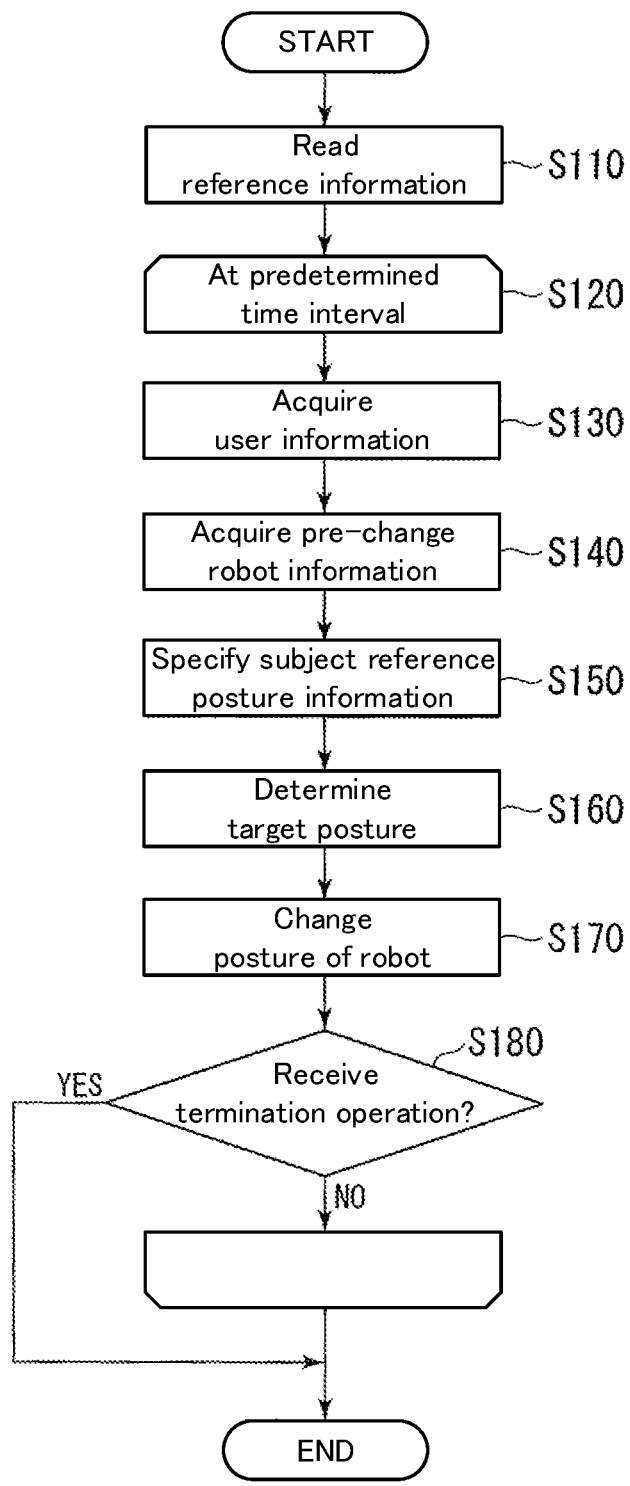
FIG. 3 is a diagram illustrating an example of a process of the robot control apparatus operating a robot.

Hereinafter, the process of the robot control apparatus 30 operating the robot 20 will be described while referencing FIG. 3. FIG. 3 is a diagram illustrating an example of a process of the robot control apparatus 30 operating the robot 20. In the following, a case will be described in which the robot control apparatus 30 receives a start operation for starting the operation of the robot 20 by the user (in this case, the first user U1) wearing the user apparatus 10 at a timing before step S110 is executed.

The specification part 364 reads the reference information from the database DB of the server SB (step S110). Here, the database DB may be configured to store a plurality of pieces of the reference information. In this case, identification information required for the specification part 364 to read the reference information desired by the user is associated with each piece of the reference information. The identification information is, for example, information including at least one of user identification information indicating the second user, proficiency information indicating the second user's proficiency in operating the robot 20, and task information indicating the type of task to be executed by the robot 20. It should be noted that the identification information may include other information instead of some or all of the user identification information, the proficiency information, and the task information, and may include other information in addition to some or all of the user identification information, the proficiency information, and the task information.

The specification part 364 receives the identification information from the user in advance at a timing before step S110 is executed. In step S110, the specification part 364 reads the reference information associated with the received identification information from the database DB. The specification part 364 may be configured to read the reference information associated with the identification information most similar to the received identification information from the database DB on the basis of a machine-learning algorithm. In this case, the machine-learning algorithm needs to learn combinations of the identification information and the reference information corresponding to the identification information. The machine-learning algorithm may be a known algorithm such as deep learning, or may be an algorithm to be developed.

Subsequently, the robot control part 35 and the control apparatus 36 repeat the processes from step S130 to step S180 at a predetermined time interval (step S120).

The user information acquisition part 361 acquires the user information from the user apparatus 10 via the network N (step S130). Then, the pre-change robot information acquisition part 362 acquires the pre-change robot information from the robot 20 (step S140). It should be noted that, in the robot control apparatus 30, the processes of step S130 and step S140 may be performed in reverse order or may be performed in parallel.

Next, the specification part 364 specifies, as the subject reference posture information, the reference posture information corresponding to (i) the first user posture information included in the user information acquired by the user information acquisition part 361 in step S130 and (ii) the pre-change posture information included in the pre-change robot information acquired by the pre-change robot information acquisition part 362 in step S140 from among the reference information read from the database DB in step S110 (step S150). Here, the process of step S150 will be described.

The specification part 364 converts the first user posture information included in the user information acquired from the user information acquisition part 361 in step S130 into temporary target posture information, which is information represented by the rotation angle, the angular velocity, the angular acceleration, and the torque of each of one or more motors included in the robot 20, on the basis of inverse kinematics. The specification part 364 uses (as input parameters) the temporary target posture information obtained by converting the first user posture information and the pre-change posture information included in the pre-change robot information acquired from the pre-change robot information acquisition part 362 in step S140, and specifies, as the subject reference posture information, the reference posture information most likely to be the reference posture information corresponding to the temporary target posture information and the pre-change posture information from among the reference information read from the database DB in step S110, on the basis of the machine-learning algorithm.

In this case, the machine-learning algorithm needs to learn combinations of the temporary target posture information, the pre-change posture information, and the reference posture information corresponding to the temporary target posture information and the pre-change posture information. The machine-learning algorithm may be a known algorithm such as deep learning, or may be an algorithm to be developed.

It should be noted that the reference information is information including information in which the second user posture information is associated with the reference posture information for each piece of the second user posture information, but may instead be information including the reference posture information and not including the second user posture information. In this case, the specification part 364 uses the temporary target posture information (as an input parameter) to specify, as the subject reference posture information, the reference posture information most likely to be the reference posture information corresponding to the temporary target posture information from among the reference information read out from the database DB in step S110, on the basis of the machine-learning algorithm. In addition, the reference information may be information in which the second user posture information, the reference posture information, and other information are associated with each other for each piece of the second user posture information.

In this case, the specification part 364 uses the temporary target posture information, the pre-change posture information, and the other information (as the input parameters), and specifies, as the subject reference posture information, the reference posture information most likely to be the reference posture information corresponding to the temporary target posture information from among the reference information read out from the database DB in step S110, on the basis of the machine-learning algorithm. Such other information is, for example, second detection information that is the detection information detected by the second robot (in this example, the robot 20).

After the process of step S150 is performed, the determination part 365 determines the target posture corresponding to the posture indicated by the first user posture information acquired by the user information acquisition part 361 in step S130, on the basis of the temporary target posture information converted by the specification part 364 in step S150 and the subject reference posture information specified by the specification part 364 in step S150 (step S160). The target posture is a desired posture with which the posture of the robot 20 is desired to coincide if the posture of the first user U1 is the user's posture indicated by the first user posture information. Here, the process of step S160 will be described.

As an example, the determination part 365 calculates a difference between the temporary target posture information converted by the specification part 364 in step S150 and the subject reference posture information specified by the specification part 364 in step S150. Here, the temporary target posture information is represented by a vector having, as components, a plurality of rotation angles, a plurality of angular velocities, a plurality of angular accelerations, and a plurality of torques, each of which represents the posture indicated by the temporary target posture information. Further, the subject reference posture information is represented by a vector having, as components, a plurality of rotation angles, a plurality of angular velocities, a plurality of angular accelerations, and a plurality of torques, each of which represents the posture indicated by the subject reference posture information. The determination part 365 calculates the difference vector of these vectors as a temporary correction amount used for calculating a correction amount for correcting the temporary target posture information.

The determination part 365 uses the calculated temporary correction amount and the temporary target posture information to calculate, on the basis of the machine-learning algorithm, the correction amount most likely to be the correction amount for correcting the temporary target posture information. In this case, the machine-learning algorithm needs to learn combinations of the temporary target posture information, the temporary correction amount, and the correction amount corresponding to the temporary target posture information and the temporary correction amount. The machine-learning algorithm may be a known algorithm such as deep learning, or may be an algorithm to be developed. The determination part 365 corrects the temporary target posture information by adding the calculated correction amount to the temporary target posture information, and determines the posture indicated by the corrected temporary target posture information as the target posture.

Here, the correction amount is a correction amount for reducing the difference between the temporary target posture information and the subject reference posture information.

It should be noted that the determination part 365 may calculate the correction amount most likely to be the correction amount for correcting the temporary target posture information on the basis of the machine-learning algorithm using the temporary target posture information converted by the specification part 364 in step S150 and the subject reference posture information specified by the specification part 364 in step S150, without calculating the difference vector. The machine-learning algorithm needs to learn combinations of the temporary target posture information, the subject reference posture information, and the correction amount corresponding to the temporary target posture information and the subject reference posture information.

After the process of step S160 is performed, the robot control part 35 operates the robot 20, and changes the posture of the robot 20 to the target posture on the basis of the information indicating the target posture determined by the determination part 365 in step S160 (step S170). Subsequently, the robot control part 35 determines whether or not a termination operation for terminating the operation of the robot 20 has been received from the user (step S180). If it is determined that the termination operation has been received from the user (step S180—YES), the robot control part 35 terminates the process. On the other hand, if the robot control part 35 determines that the termination operation has not been received from the user, the step is transferred to step S130, and the user information acquisition part 361 acquires the user information from the user apparatus 10 via the network N.

As described above, the robot control apparatus 30 acquires the first information (the user information in the embodiment), and acquires the second information (the pre-change robot information in the embodiment) including at least the pre-change posture information from among the pre-change posture information indicating the posture before change and the first detection information. Then, the robot control apparatus 30 determines a target posture corresponding to the first user's posture indicated by the first user posture information included in the first information, which is the posture of the first robot (the robot 20 in this example) on the basis of (i) the reference information including information in which, for each piece of the second user posture information indicating the second user's posture, which is the posture of the second user, the second user posture information is associated with the reference posture information indicating the posture serving as the reference, (ii) the acquired first information, and (iii) the acquired second information. Accordingly, the robot control apparatus 30 can assist the first user who is not familiar with the operation of the robot 20 so that the first user can perform an operation equivalent to the preferable operation corresponding to the reference information.

Process of Robot Control Apparatus Generating Reference Information

The robot system 1 also performs the process of generating the reference information described above. Therefore, the processing will be described below. In the following explanation, the user apparatus 10 is attached to a third user. The third user is, for example, a user who can perform a preferable operation as a reference. It should be noted that the third user may be the same person as the second user or the first user U1. Further, the robot system 1 may have a configuration in which this process is not performed. In this case, the reference information is stored in the database DB of the server SB by another information processing apparatus. Further, in this instance, the robot control apparatus 30 (or the control apparatus 36) does not include a generation part 366, which will be described in detail below.

The robot system 1 does not need to perform the process of the flowchart shown in FIG. 3. In this case, the reference information stored in the database DB of the server SB is used by another information processing apparatus. In this instance, the robot control apparatus 30 (or the control apparatus 36) does not include the specification part 364 and the determination part 365.

Figure 4:
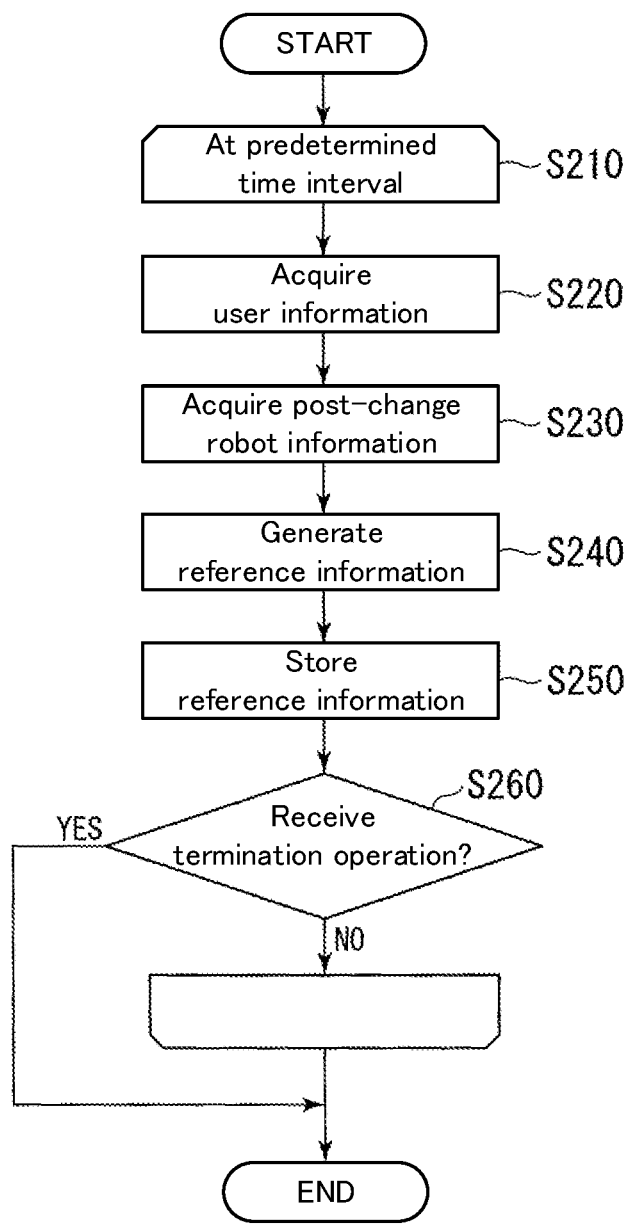
FIG. 4 is a diagram illustrating an example of a process of the robot control apparatus generating reference information.

Hereinafter, the process of generating the reference information by the robot control apparatus 30 will be described while referencing FIG. 4. FIG. 4 is a diagram illustrating an example of a process of the robot control apparatus 30 generating the reference information. The flowchart shown in FIG. 4 shows the process performed by the robot control apparatus 30 between the time when the third user starts operating the third robot and the time when the third user terminates the operation of the third robot. However, in the flowchart, the process relating to the operation of the third robot by the third user is omitted. The third robot is a robot operated by the third user. Hereinafter, a case where the third robot is the robot 20 will be described as an example. It should be noted that the third robot may be another robot instead of the robot 20.

The robot control part 35 and the control apparatus 36 repeat the processes from step S220 to step S260 at a predetermined time interval from the time when the third user starts operating the robot 20 (step S210).

The user information acquisition part 361 acquires the user information, which is information including the third user posture information indicating the third user's posture, which is the posture of the third user, from the user apparatus 10 via the network N (step S220). Subsequently, the post-change robot information acquisition part 363 acquires the post-change robot information from the robot 20 (step S230). In the robot control apparatus 30, the processes of step S220 and step S230 may be performed in reverse order or may be performed in parallel. The robot control apparatus 30 may be configured to acquire the post-change robot information from the robot 20 and acquire the user information including the user posture information indicating the user's posture corresponding to the posture indicated by the post-change posture information included in the post-change robot information.

Next, on the basis of the third user information acquired by the user information acquisition part 361 in step S220 and the post-change robot information acquired by the post-change robot information acquisition part 363 in step S230, the generation part 366 generates the reference information including information in which the third user posture information is associated with the reference posture information indicating the posture serving as the reference (step S240). Here, the process of step S240 will be described.

The generation part 366 generates the reference information, on the basis of the machine-learning algorithm, using the user information acquired by user information acquisition part 361 in step S220 and the post-change robot information acquired by the post-change robot information acquisition part 363 in step S230. Specifically, using the third user posture information included in the user information and the post-change posture information included in the post-change robot information, the generation part 366 calculates, as the reference posture information indicating the posture serving as the reference and corresponding to the third user's posture, the posture most likely to be the posture corresponding to the third user's posture indicated by the third user posture information, on the basis of the machine-learning algorithm. The generation part 366 generates the reference information including information in which the calculated reference posture information is associated with the third user posture information. Here, the machine-learning algorithm needs to learn combinations of the third user posture information, the post-change posture information, and the reference posture information. The machine-learning algorithm may be a known algorithm such as deep learning, or may be an algorithm to be developed.

It should be noted that the generation part 366 may specify, as the reference posture information, the post-change posture information included in the post-change robot information acquired by the post-change robot information acquisition part 363 in step S230, and generate the reference information including information in which the specified reference posture information is associated with the third user posture information included in the user information acquired by the user information acquisition part 361 in step S220.

Further, in a case where the previously generated reference information can be acquired from the database DB of the server SB, the generation part 366 may acquire the reference information, and calculate, on the basis of the machine-learning algorithms, the posture most likely to be the posture corresponding to the third user posture information included in the user information using (i) the acquired reference information, (ii) the user information acquired by the user information acquisition part, and (iii) the post-change robot information acquired by the post-change robot information acquisition part. In this instance, the generation part 366 specifies the information indicating the calculated posture as the reference posture information to be associated with the third user posture information, and generates the reference information including information in which the specified reference posture information is associated with the third user posture information.

After the process of step S240 is performed, the storage control part 367 stores the reference information generated by the generation part 366 in step S240 in the database DB of the server SB via the network N (step S250). Subsequently, the robot control part 35 determines whether or not a termination operation for terminating the operation of the robot 20 has been received from the user (the third user in this example) wearing the user apparatus 10 (step S260). If it is determined that the termination operation has been received (step S260—YES), the robot control part 35 terminates the process. On the other hand, if the robot control part 35 determines that the termination operation has not been received, the step is transferred to step S220, and the user information acquisition part 361 acquires the user information from the user apparatus 10 via the network N.

Here, the processes from step S210 to step S260 described above will be briefly summarized. The processes of step S220 and step S230 in the flowchart shown in FIG. 4 is, in other words, a process of acquiring teacher data for the control apparatus 36 to generate the reference information using the machine-learning algorithm. The processes from step S240 to step S250 are processes for generating the reference information as a model generated by the machine-learning algorithm using the acquired teacher data.

Conventionally, in order to acquire the teacher data, a pilot (preliminary) robot system 1 for acquiring the teacher data has to be operated. However, in the robot system 1, since the control apparatus 36 performs the processes of step S220 to step S230, the control apparatus 36 can acquire the teacher data without requiring the operation of the pilot robot system 1, and can acquire the teacher data while the robot 20 is performing a non-pilot task (for example, an actual task).

The control apparatus 36 is not configured to store the user information and the post-change robot information acquired as the teacher data in the flowchart shown in FIG. 4 in the server SB, but may instead be configured to store the user information and the post-change robot information in the server SB. As a result, the control apparatus 36 can construct big data about the teacher data relating to the operation of the robot 20. The reference information generated on the basis of the big data constructed in this way can be used to assist the operation of the robot by the user, and also can be used as information for the robot control apparatus 30 to automatically operate the robot 20 without requiring the operation by the user.

When the robot control apparatus 30 is enabled to automatically operate the robot 20 for executing a certain task, in the robot system 1, the user operates the robot 20 to cause the robot 20 to execute a task different from this certain task and acquires the teacher data required for the control apparatus 36 to automatically cause the robot 20 to execute this certain task. By repeating such a process, the robot system 1 eventually can automatically cause the robot 20 to execute almost all of the tasks performed by the user.

It should be noted that the robot system 1 may include a plurality of user apparatuses 10 and robots 20 corresponding to the respective user apparatuses 10. That is, in the robot system 1, a portion of the robots 20 corresponding to each of the plurality of user apparatuses 10 can be made to automatically execute a predetermined task (which may be different for each robot 20), a robot 20 other than this portion of the robots 20 corresponding to each of the plurality of user apparatuses 10 can be operated by the user, and a robot 20 that does not perform a desired action among this portion of the robots 20 can be assisted by the robot 20 operated by the user.

The reference information generated on the basis of the constructed big data may be used to improve the action of the robot 20 operated by the user to an action suitable for the task being executed by the user. In this case, in the robot system 1, the robot control apparatus 30 (that is, the control apparatus 36) improves (changes), on the basis of the reference information, the action of the robot 20 in accordance with the operation of the user to an action suitable for the task. This enables the robot control apparatus 30 to make the robot 20 operate appropriately, even if an unskilled user operates the robot.

The reference information generated on the basis of the constructed big data may be used to complement at least a portion of the body functions of the robot 20 operated by the user. In this instance, the robot control apparatus 30 (that is, the control apparatus 36) complements at least the portion of the body functions of the robots 20 operated by the user on the basis of the reference information. In this case, for example, the robot control apparatus 30 can operate a plurality of robots (some or all of which may be the robot 20, but do not need to be the robot 20) by the operation of a single user. At this time, the robot control apparatus 30 may cause the plurality of robots to operate substantially simultaneously by the operation, or may cause some or all of the plurality of robots to operate at different timings.

In this instance, the robot control apparatus 30 accepts login to one robot 20 from a plurality of regions, and allows users who have logged in to operate the robot 20. As a result, users in different regions can operate the robot 20 for a long time without a break by utilizing the time difference. Consequently, the robot control apparatus 30 can increase the efficiency of work of the robot 20.

Though the explanation is omitted in the above, the various types of information (the pre-change posture information, visual information, tactile information, and auditory information) included in the pre-change robot information acquired by the control apparatus 36 must be synchronized with each other. Synchronization of the various types of information may be performed in the user apparatus 10, in the robot control apparatus 30, or in other device connected to the network N. The synchronization of the various types of information is realized by, for example, a time stamp. It should be noted that the synchronization may be realized by a method other than the time stamp.

The control apparatus 36 may acquire the user information not including the user posture information as the teacher data, or may acquire the post-change robot information not including the post-change posture information as the teacher data. In this case, the user information includes, for example, information detected by various sensors (for example, an image capturing part, a tactile sensor, a sound detection part, etc.) provided in the user apparatus 10 and synchronized by the time stamp or the like. In this case, the post-change robot information includes, for example, the detection information synchronized by the time stamp or the like. That is, the control apparatus 36 constructs the big data of the teacher data not including at least one piece of the user posture information or the post-change posture information. In this instance, the control apparatus 36 may or may not perform the process of the flowchart shown in FIG. 3 on the basis of, for example, the reference information generated by another device.

The robot system 1 described above is an example of telexistence including the control apparatus 36. Here, the detailed description of telexistence is omitted because it is described in Japanese Unexamined. Patent Application Publication No. S62-29196 and the above-mentioned Non-Patent Document 1.

The big data constructed in the robot system 1 may be a set of the user information and the post-change robot information for each execution in a case where one user repeatedly causes the robot 20 to execute a task many times, or may be a set of the user information and the post-change robot information for each user in a case where each of a plurality of users causes the robot 20 to execute the task.

As described above, the robot control apparatus 30 (or the control apparatus 36) acquires the third information (in this example, the user information), and acquires fourth information (in this example, the post-change robot information) including at least the post-change posture information from among (i) the post-change posture information indicating the post-change posture, which is the posture of the third robot after the posture of the third robot (in this example, the robot 20) has changed to the target posture corresponding to the posture indicated by the third user posture information included in the acquired third information, and (ii) the third detection information (in this example, the detection information). On the basis of the acquired third information and the acquired fourth information, the robot control apparatus 30 (or the control apparatus 36) generates, for each piece of the third user posture information included in the third information, the reference information including information in which the third user posture information is associated with the reference posture information indicating the posture serving as the reference. Consequently, the robot control apparatus 30 can assist the user in operating the robot on the basis of the generated reference information.

In a case where the robot control apparatus 30 and the control apparatus 36 are separate entities, the control apparatus 36 is communicably connected to each of the user apparatus 10, the robot 20, the robot control apparatus 30, and the server SB. Then, the control apparatus 36 outputs the information indicating the target posture determined by the determination part 365 to the robot control part 35 provided in the robot control apparatus 30, and outputs the reference information generated by the generation part 366 to the database DB of the server SB to store the reference information. In this instance, the control apparatus 36 may be provided in the user apparatus 10, may be provided in the robot 20, or may be provided in the server SB.

Process in a Case Where Server SB Includes Control Apparatus 36

Figure 5:
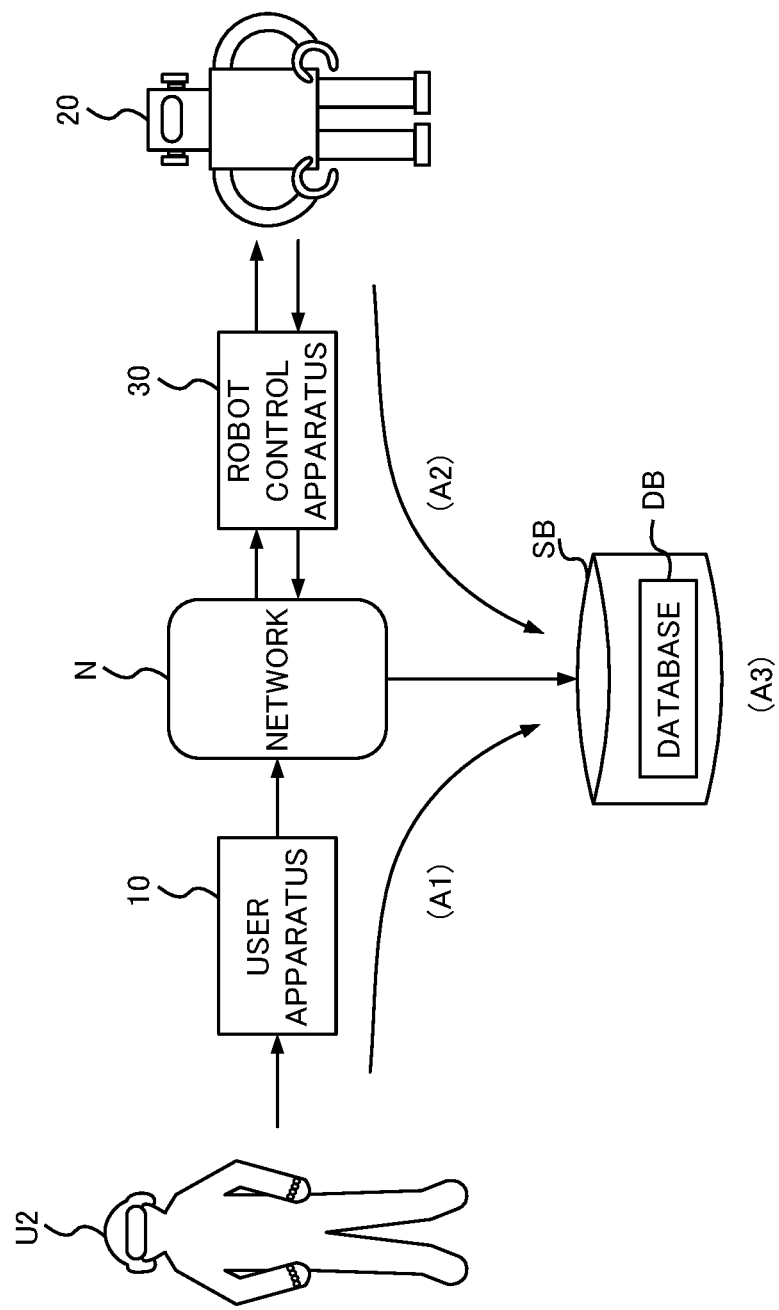
FIG. 5 is a diagram for explaining procedures for generating reference posture information in a case where a server includes a control apparatus.
Figure 6:
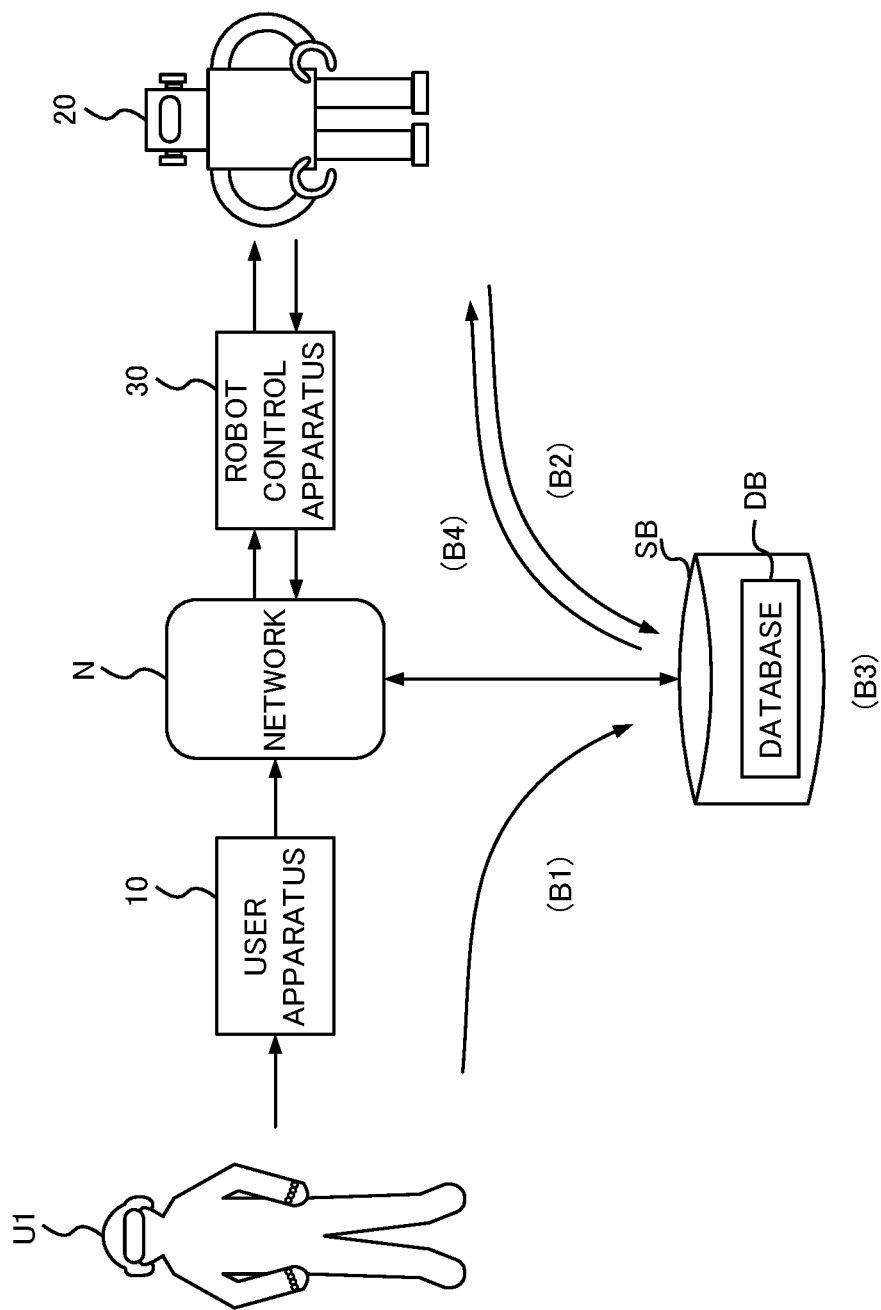
FIG. 6 is a diagram for explaining procedures for controlling the robot in a case where the server includes the control apparatus.

In the above explanation, the robot control apparatus 30 includes the control apparatus 36, but the server SB may include the control apparatus 36. FIG. 5 is a diagram for explaining procedures for generating the reference posture information in a case where the server SB includes the control apparatus 36. FIG. 6 is a diagram for explaining procedures for controlling the robot 20 in a case where the server SB includes the control apparatus 36. The configuration and operation of the control apparatus 36 in the following descriptions may be applied in the case where the robot control apparatus 30 includes the control apparatus 36.

Process for Generating Reference Information

FIG. 5 shows a process in the server SB generates the reference information on the basis of the second user posture information, which is the reference posture information indicating the posture of the second user (the user indicated by the reference numeral U2 in FIG. 5) who is familiar with the operation of the robot 20. The server SB periodically acquires the posture information indicating the posture of the robot 20 via the robot control apparatus 30.

After the user information acquisition part 361 of the server SB acquires the second user posture information via the user apparatus 10 (A1), the pre-change robot information acquisition part 362 acquires the most recent posture information of the robot 20 at the time when the user information acquisition part 361 acquires the second user posture information as the pre-change posture information (A2).

Since the second user U2 is familiar with the operation of the robot 20, it is considered that the operation performed by the second user U2 for the robot 20 with the posture indicated by the pre-change posture information is a desirable operation. Accordingly, the generation part 366 generates a plurality of pieces of the reference information by associating the pre-change posture information acquired by the pre-change robot information acquisition part 362 with the second user posture information as the reference posture information acquired by the user information acquisition part 361 (A3).

Incidentally, just because the robots 20 are in the same posture, the posture that the user wants the robots 20 to take next is not necessarily the same. For example, even if the robots 20 are in the same posture, there may be a robot 20 being operated to grasp an object, or a robot 20 being operated to tilt the object. Therefore, the generation part 366 may generate a plurality of pieces of the reference information by associating (i) the plurality of pieces of the pre-change posture information acquired immediately before the user information acquisition part 361 acquires the second user posture information with (ii) the second user posture information. If the generation part 366 generates the reference information in this manner, the probability that the first user U1 who is not familiar with the operation of the robot 20 can, by using the reference information, cause the robot 20 to perform a desired action is improved.

Further, the generation part 366 may generate a plurality of pieces of the reference information in which the pre-change posture information is associated with the second user posture information for each piece of operation content of the second user. For example, the generation part 366 estimates the operation content on the basis of a plurality of pieces of consecutive second user posture information, generates a plurality of pieces of the reference information corresponding to the estimated operation content, and stores the reference information in the database DB. The generation part 366 may store the plurality of pieces of the reference information in the database DB in association with text information indicating the operation content inputted by the second user. Specifically, the generation part 366 stores, for example, the reference posture information in the database DB in association with each of the operation content of having the robot 20 grab the object at the pre-change posture indicated by the pre-change posture information and the operation content of having the robot 20 tilt the object. The generation part 366 may store the plurality of pieces of reference information in the database in association with the attributes of the second user U2 (such as the length of the operation experience of the robot 20, the size of the body, the sex, and the like).

The generation part 366 may generate a machine-learning model capable of outputting the reference posture information suitable for the inputted pre-change posture information and the inputted first user posture information, using the pre-change posture information and the second user posture information as the teacher data. For example, the generation part 366 can update the machine-learning model by inputting the pre-change posture information and the second user posture information to the previously constructed machine-learning model, and can output the reference posture information suitable for the first user posture information inputted to the machine-learning model.

Instead of directly using the second user posture information, the generation part 366 may generate the reference posture information on the basis of the post-change posture information of the robot 20 that acted on the basis of the second user posture information. For this purpose, the generation part 366 acquires the post-change posture information from the post-change robot information acquisition part 363 serving as the fourth information acquisition part for acquiring the post-change posture information indicating the post-change posture after the robot changes the posture on the basis of the second user posture information. The generation part 366 specifies the second user posture information on the basis of the pre-change posture information and the post-change posture information, and associates the pre-change posture information with the specified second user posture information, thereby generating the plurality of pieces of the reference posture information.

Process for Operating Robot 20 on the Basis of Reference Information

Next, the operation of the server SB in a case where the first user U1 who is not familiar with the operation of the robot 20 operates the robot 20 will be described while referencing FIG. 6. Also in the example shown in FIG. 6, the server SB periodically acquires the posture information indicating the posture of the robot 20 via the robot control apparatus 30.

After the user information acquisition part 361 of the server SB acquires the first user U1's posture information via the user apparatus 10 (B1), the pre-change robot information acquisition part 362 acquires the most recent posture information of the robot 20 at the time when the user information acquisition part 361 acquires the first user posture information as the pre-change posture formation (B2). Subsequently, the determination part 365 of the server SB determines, as the posture of the robot, a target posture different from the posture of the first user U1 on the basis of the pre-change posture information and the first user posture information acquired by the user information acquisition part 361 as the first information acquisition part at the time when the robot is in the pre-change posture indicated by the pre-change posture information.

Specifically, the specification part 364 refers to the database DB and selects one piece of reference posture information from the plurality of pieces of reference posture information (B3). The specification part 364 notifies the determination part 365 about the selected reference posture. The determination part 365 determines the posture indicated by the notified reference posture as the target posture. The determination part 365 transmits, as the subject reference posture information, the reference posture information corresponding to the determined target posture to the robot control apparatus 30 (B4). Hereinafter, the operation of the specification part 364 will be described in detail.

The specification part 364 specifies the subject reference posture information corresponding to the pre-change posture information and the first user posture information acquired by the user information acquisition part 361 at the time when the robot 20 is in the pre-change posture indicated by the pre-change posture information, from among the plurality of pieces of the reference posture information used to change the posture of the robot 20. That is, the specification part 364 selects, as the subject reference posture information, the reference posture information corresponding to one piece of reference information selected from the plurality of pieces of reference information in which the pre-change posture information is associated with the reference posture information indicating the posture of the second user U2 acquired at a previous point in time when the robot 20 is in the pre-change posture indicated by the pre-change posture information.

Specifically, the specification part 364 estimates the posture of the second user U2 corresponding to the posture of the first user U1 indicated by the first user posture information on the basis of the pre-change posture information and the first user posture information. Then, the specification part 364 specifies, as the subject reference posture information, the reference posture information stored in the database DB in association with the second user posture information indicating the estimated posture of the second user U2. By having the specification part 364 select the subject reference posture information in this manner, the determination part 365 can determine the target posture that best matches the posture of the first user U1, so that the first user U1 can appropriately operate the robot 20.

On the basis of the first user posture information acquired by the user information acquisition part 361 serving as the first information acquisition part and the pre-change posture information acquired by the pre-change robot information acquisition part 362 serving as the second information acquisition part, the specification part 364 selects one piece of reference information having a relatively high probability of changing the posture of the robot to the target posture intended by the first user, from the plurality of pieces of reference information.

The specification part 364 may estimate the target posture intended by the first user U1 on the basis of the first user posture information and the pre-change posture information, and may select one piece of reference information having a relatively high probability of changing the posture of the robot to the estimated target posture. As a specific process, the specification part 364 generates the temporary target posture information indicating the rotation angle, the angular velocity, the angular acceleration, and the torque of each of one or more motors of the robot 20, on the basis of the first user posture information acquired by the user information acquisition part 361. The specification part 364 specifies the subject reference posture information on the basis of the generated temporary target posture information and the pre-change posture information.

The specification part 364 may estimate the target posture by specifying the operation content of the first user U1 on the basis of the first user posture information, for example. Specifically, in a case where the generation part 366 generates the plurality of pieces of the reference information in which the pre-change posture information is associated with the second user posture information for each piece of operation content of the second user, the specification part 364 specifies the operation content that the first user U1 intends to perform, and selects one piece of reference information corresponding to the pre-change posture information from the plurality of pieces of reference information corresponding to the specified operation content. The specification part 364 may specify the operation content to be performed by the first user U1 on the basis of a plurality of pieces of consecutive first user posture information, or may specify the operation content on the basis of text information indicating the operation content inputted by the first user U1. The specification part 364 can increase the possibility that the target posture intended by the first user U1 can be correctly specified by using the result of specifying the operation content.

Incidentally, it is considered that the posture of the first user U1 having a relatively long experience of operating the robot 20 is closer to the posture of the second user U2 having performed the same operation in the state where the pre-change posture of the robot 20 is the same than the posture of the first user U1 having a relatively short experience of operating the robot 20. Therefore, the specification part 364 may acquire information indicating the length of experience the first user U1 has in operating the robot 20, and may estimate the second user posture information corresponding to the first user posture information on the basis of the acquired information.

Specifically, the specification part 364 selects one piece of reference posture information from the plurality of pieces of reference posture information assumed to correspond to the pre-change posture information and the first user posture information on the basis of the length of experience that the first user U1 has in operating the robot 20. In this manner, the determination part 365 can determine the target posture on the basis of the reference posture information most suitable for the operation to be performed by the first user U1. It should be noted that the specification part 364 may select one piece of reference posture information from the plurality of pieces of reference posture information associated with attributes such as the size of the body or sex of the first user U1, in addition to the length of the operating experience of the first user U1.

The specification part 364 may specify the subject reference posture information by inputting the pre-change posture information and the first user posture information to the machine-learning model created by using the plurality of pieces of pre-change posture information and the plurality of pieces of second user posture information as the teacher data. The specification part 364 specifies the reference posture information outputted from the machine-learning model as the subject reference posture information.

In order to enable the determination part 365 to determine the target posture using the first user posture information and the pre-change posture information acquired at the same time, the user information acquisition part 361 may acquire the first user posture information in association with a time, and the pre-change robot information acquisition part 362 may acquire the pre-change posture information association with a time. In this instance, the determination part 365 determines the target posture as the posture of the robot 20 on the basis of the pre-change posture information and the first user posture information associated with the same time. With the determination part 365 having such a configuration, the target posture is determined on the basis of the posture of the robot 20 at the time when the first user U1 changes the posture, so that the determination part 365 is more likely to determine the target posture according to the intent of the first user U1.

While the embodiment of the present invention has been described above in detail with reference to the drawings, specific configurations are not limited to the embodiment, and may be changed, substituted, deleted, or the like without departing from the scope of the invention.

Further, a program for realizing the function of an optional component of the above-described apparatus (for example, the robot control apparatus 30 or the control apparatus 36) may be recorded on a computer-readable recording medium, and the program may be read and executed by the computer system. Here, the term "computer system" includes hardware such as an operating system (OS) and peripheral devices. A "computer-readable recording medium" refers to a portable medium such as a flexible disk, a magneto-optical disk, a ROM, a compact disk (CD)-ROM, or a storage device such as a hard disk incorporated in a computer system. Further, the "computer-readable recording medium" includes a recording medium that holds a program for a predetermined time, such as a volatile memory (RAM) in a computer system serving as a server or a client when the program is transmitted via a network such as the Internet or a communication line such as a telephone line.

The program may be transmitted from a computer system in which the program is stored in a storage device or the like to another computer system via a transmission medium or by a transmission wave in the transmission medium. Here, the "transmission medium" for transmitting a program refers to a medium having a function of transmitting information, for example, a network (communication network) such as the Internet or a telecommunication line (communication line) such as a telephone line.

Further, the above-mentioned program may be a program for realizing a part of the above-mentioned functions. Furthermore, the above-mentioned program may be a so-called difference file (difference program) capable of realizing the above-mentioned function in combination with a program already recorded in the computer system.

APPENDIX

The present invention can also be understood as the following invention.

(1) A control apparatus comprising:
a user apparatus that detects information about a first user;
a first robot; and
a robot control apparatus that controls the first robot, wherein
the control apparatus is included in a robot system, and the control apparatus:
acquires, from the user apparatus, first information including first user posture information indicating a first user's posture which is a posture of the first user,
changes a pre-change posture, which is a posture of the first robot before changing the posture on the basis of the acquired first information, to a target posture corresponding to the first user's posture indicated by the first user posture information included in the acquired first information, and
causes the user apparatus to perform a process according to first detection information detected by the first robot, wherein
the control apparatus includes:
a first information acquisition part that acquires the first information;
a second information acquisition part that acquires second information including at least the pre-change posture information from among the pre-change posture information indicating the pre-change posture and the first detection information; and
a determination part that determines the target posture corresponding to the first user's posture indicated by the first user posture information included in the first information, which is the posture of the first robot, on the basis of
(i) reference information including information in which second user posture information and the reference posture information indicating a posture serving as the reference are associated with each other for each piece of second user posture information indicating a second user's posture, which is the posture of the second user,
(ii) the first information acquired by the first information acquisition part, and
(iii) the second information acquired by the second information acquisition part.
(2) The control apparatus comprising:
a specification part that specifies, as subject reference posture information, the reference posture information corresponding to the first user posture information included in the first information acquired by e first information acquisition part and the pre-change posture information included in the second information acquired by the second information acquisition part from among the pieces of reference information, wherein
the determination part determines the target posture on the basis of the subject reference posture information specified by the specification part and the first user posture information included in the first information acquired by the first information acquisition part.
(3) The control apparatus, wherein
the pre-change posture information is information represented by a rotation angle, an angular velocity, an angular acceleration, and a torque of each of one or more motors included in the first robot at present,
the posture indicated by the reference posture information is a posture corresponding to the second user's posture indicated by the second user posture information among the postures of the second robot, and the second user posture information associated with the reference posture information for each piece of the reference posture information is information represented by a rotation angle, an angular velocity, an angular acceleration, and a torque of each of one or more motors included in the second robot, wherein
the specification part converts, on the basis of inverse kinematics, the first user posture information included in the first information acquired by the first information acquisition part into temporary target posture information, which is information represented by a rotation angle, an angular velocity, an angular acceleration, and a torque of each of one or more motors included in the first robot, and specifies the subject reference posture information on the basis of the converted temporary target posture information and the pre-change posture information included in the second information acquired by the second information acquisition part.
(4) The control apparatus, wherein
the specification part specifies, as the subject reference posture information, the reference posture information most likely to be the reference posture information corresponding to the first user posture information included in the first information acquired by the first information acquisition part and the pre-change posture information included in the second information acquired by the second information acquisition part from among the pieces of reference information.
(5) The control apparatus comprising:
a user apparatus that detects information about a third user;
a third robot; and
a robot control apparatus that controls the third robot, wherein
the control apparatus is included in a robot system, and the control apparatus:
acquires, from the user apparatus, third information including third user posture information indicating a third user's posture which is a posture of the third user,
changes a pre-change posture, which is a posture of the third robot before changing the posture on the basis of the acquired third information, to a target posture corresponding to the third user's posture indicated by the third user posture information included in the acquired third information, and also
causes the user apparatus to perform a process according to third detection information detected by the third robot, wherein
the control apparatus includes:
a third information acquisition part that acquires the third information;
a fourth information acquisition part that acquires fourth information including at least the post-change posture information among post-change posture information indicating a post-change posture that is the posture of the third robot after the posture of the third robot has changed to the target posture corresponding to the posture indicated by the third user posture information included in the third information acquired by the third information acquisition part and the third detection information; and
a generation part that generates the reference information including information in which the third user posture information is associated with the reference posture information indicating the posture serving as the reference for each piece of the third user posture information included in the third information on the basis of the third information acquired by the third information acquisition part and the fourth information acquired by the fourth information acquisition part.

(6) The control apparatus, wherein
the generation part generates the reference information, on the basis of a machine-learning algorithm, using the third information acquired by the third information acquisition part and the fourth information acquired by the fourth information acquisition part.

(7) The control apparatus, wherein
the generation part acquires the reference information if the reference information generated in the past can be acquired,
calculates the posture most likely to be the posture corresponding to the third user posture information included in the third information using the acquired reference information, the third information acquired by the third information acquisition part, and the fourth information acquired by the fourth information acquisition part,
specifies information indicating the calculated posture as the reference posture information to be associated with the third user posture information, and
generates the reference information including the information in which the specified reference posture information is associated with the third user posture information.

(8) The control apparatus comprising:
a user apparatus that detects information about a fifth user;
a fifth robot; and
a robot control apparatus that controls the fifth robot, wherein
the control apparatus is included in a robot system, and the control apparatus:
acquires fifth user posture information indicating a fifth user's posture, which is a posture of the fifth user, from the user apparatus,
changes a pre-change posture, which is a posture of the fifth robot before changing the posture on the basis of the acquired fifth user posture information, to a target posture, which is a posture corresponding to the fifth user's posture indicated by the acquired fifth user posture information, and
causes the user apparatus to perform a process according to the fifth detection information detected by the fifth robot, wherein
the control apparatus:
acquires fifth information, which is one or more pieces of information detected by the user apparatus and which is synchronized information, and sixth information, which is one or more pieces of information detected by the fifth robot and which is synchronized information, and
stores the acquired fifth information and the acquired sixth information in the storage part.

(9) The control apparatus, wherein
the fifth information includes the fifth user posture information,
the sixth information includes at least the post-change posture information from among the post-change posture information indicating the post-change posture, which is the posture of the fifth robot after the posture of the fifth robot has changed to the target posture corresponding to the posture indicated by the fifth user posture information, and the fifth detection information.

The present invention has been described above on the basis of the exemplary embodiments. The technical scope of the present invention is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. A control apparatus comprising a processor configured to:
acquire first user posture information indicating a posture of a first user operating a robot;
acquire pre-change posture information indicating a pre-change posture, which is a posture of the robot before changing the posture of the robot on the basis of the first user posture information;
read reference information stored in advance in a database from the database, the reference information including information in which second user posture information, which indicates a posture of a second user operating a robot and different from the first user, is associated with reference posture information which indicates a posture of the robot operated by the second user; and
determine, as the posture of the robot, a target posture different from the posture of the first user on the basis of the reference information read from the database, the pre-change posture information and the first user posture information acquired at the time when the robot is in the pre-change posture indicated by the pre-change posture information.

2. The control apparatus according to claim 1, wherein the processor is further configured to:
specify, among the reference information read from the database, subject reference posture information corresponding to the pre-change posture information and the first user posture information acquired at the time when the robot is in the pre-change posture indicated by the pre-change posture information.

3. The control apparatus according to claim 2, wherein the processor is further configured to:
acquire the second user posture information; and
select, as the subject reference posture information, the reference posture information corresponding to one piece of reference information selected from among the plurality of pieces of reference information in which the pre-change posture information is associated with the reference posture information indicating the posture of the second user differing from the first user acquired at a previous point in time when the robot is in the pre-change posture indicated by the pre-change posture information.

4. The control apparatus according to claim 3, wherein the processor is further configured to:
select, from among the plurality of pieces of reference information, one piece of reference information having a relatively high probability of changing the posture of the robot to the target posture intended by the first user, on the basis of the first user posture information and the pre-change posture information.

5. The control apparatus according to claim 4, wherein the processor is further configured to:
estimate, on the basis of the first user posture information and the pre-change posture information, the target posture intended by the first user, and select one piece of reference information having a relatively high probability of changing the posture of the robot to the estimated target posture.

6. The control apparatus according to claim 2, wherein the processor is further configured to:

specify the subject reference posture information by inputting the pre-change posture information and the first user posture information into a machine-learning model created by using a plurality of pieces of pre-change posture information and the plurality of pieces of reference posture information as teacher data.

7. The control apparatus according to claim 2, wherein the processor is further configured to:
generate temporary target posture information indicating a rotation angle, an angular velocity, an angular acceleration, and a torque of each of one or more motors of the robot on the basis of the first user posture information, and specifies the subject reference posture information on the basis of the generated temporary target posture information and the pre-change posture information.

8. The control apparatus according to claim 2, the processor is further configured to:
acquire the second user posture information; and
generate the plurality of pieces of reference information by associating the pre-change posture information with the second user posture information serving as the reference posture information.

9. The control apparatus according to claim 8, wherein the processor is further configured to:
generate a machine-learning model capable of outputting the reference posture information suitable for the inputted pre-change posture information and the inputted first user posture information, using the pre-change posture information and the second user posture information as teacher data.

10. The control apparatus according to claim 8, wherein the processor is further configured to:
acquire post-change posture information indicating a post-change posture after the robot changes posture on the basis of the second user posture information; and
generate the plurality of pieces of reference posture information by specifying the second user posture information on the basis of the pre-change posture information and the post-change posture information and associating the pre-change posture information with the specified second user posture information.

11. The control apparatus according to claim 1, wherein the processor is further configured to:
acquire the first user posture information in association with a time,
acquire the pre-change posture information in association with a time, and
determine the target posture as the posture of the robot on the basis of the pre-change posture information and the first user posture information associated with the same time.

12. A computer-implemented robot control method comprising:
acquiring first user posture information indicating a posture of a first user operating a robot;
acquiring pre-change posture information indicating a pre-change posture, which is a posture of the robot before changing the posture of the robot on the basis of the first user posture information;
reading reference information stored in advance in a database from the database, the reference information including information in which second user posture information, which indicates a posture of a second user operating a robot and different from the first user, is associated with reference posture information which indicates a posture of the robot operated by the second user; and
determining, as the posture of the robot, a target posture different from the posture of the first user on the basis of the reference information read from the database, the pre-change posture information and the first user posture information acquired at the time when the robot is in the pre-change posture indicated by the pre-change posture information.

13. A robot control system comprising:
a robot;
a user apparatus that detects information about a first user operating the robot;
a robot control apparatus that controls the robot; and
a control apparatus capable of communicating with the user apparatus and the robot control apparatus, wherein
the user apparatus transmits first user posture information indicating the posture of the first user to the control apparatus,
the robot control apparatus controls a posture of the robot so that the robot reaches the target posture determined by the control apparatus, and
the control apparatus includes a processor configured to:
acquire the first user posture information;
acquire pre-change posture information indicating a pre-change posture, which is the posture of the robot before changing the posture of the robot on the basis of the first user posture information;
read reference information stored in advance in a database from the database, the reference information including information in which second user posture information, which indicates a posture of a second user operating a robot and different from the first user, is associated with reference posture information which indicates a posture of the robot operated by the second user;
determine, as the posture of the robot, the target posture different from the posture of the first user on the basis of the reference information read from the database, the pre-change posture information and the first user posture information acquired at the time when the robot is in the pre-change posture indicated by the pre-change posture information; and
transmit the target posture to the robot control apparatus.

\* \* \* \* \*